(12) United States Patent
O'Loughlin

(10) Patent No.: US 7,066,082 B2
(45) Date of Patent: Jun. 27, 2006

(54) JUICE EXTRACTOR

(75) Inventor: Nicholas M. O'Loughlin, Bondi (AU)

(73) Assignee: Sunbeam Corporation Limited, Bondi (AU)

( * ) Notice: Subject to any disclaimer, the term of this patent is extended or adjusted under 35 U.S.C. 154(b) by 77 days.

(21) Appl. No.: 10/894,413

(22) Filed: Jul. 15, 2004

(65) Prior Publication Data

US 2005/0035231 A1  Feb. 17, 2005

(30) Foreign Application Priority Data

Jul. 21, 2003  (AU) .............................. 2003903773

(51) Int. Cl.
*A23N 1/00* (2006.01)
*A23N 1/02* (2006.01)
*A47J 43/046* (2006.01)
*A47J 43/07* (2006.01)
*A23L 1/00* (2006.01)

(52) U.S. Cl. ......................................... 99/511; 99/513
(58) Field of Classification Search ................. 99/484, 99/485, 489, 492, 495, 509–513; 210/360.1, 210/380.1, 369; 241/37.5, 36.92, 282.1, 241/282.2; 366/314, 347, 601; 494/56, 494/58, 60, 43, 36, 84
See application file for complete search history.

(56) References Cited

U.S. PATENT DOCUMENTS

| 2,660,211 | A | * | 11/1953 | Wilhelm | 99/512 |
| 2,845,971 | A | * | 8/1958 | Sosa | 99/512 |
| 3,186,458 | A | * | 6/1965 | Takei et al. | 99/512 |
| 4,183,293 | A | * | 1/1980 | Arao et al. | 99/512 |
| 5,479,851 | A | | 1/1996 | McClean et al. | |

FOREIGN PATENT DOCUMENTS

| DE | 1080276 B | 4/1960 |
| GB | 852220 | 10/1960 |

* cited by examiner

*Primary Examiner*—Timothy F. Simone
(74) *Attorney, Agent, or Firm*—Townsend and Townsend and Crew LLP

(57) ABSTRACT

A juice extractor (10) having a base (11) upon which there is mounted an electric motor (13). The electric motor (13) drives a grating disc (32). Extending upwardly from the disc (32) is a delivery chute (24) via which food is delivered to the disc (32). A food engaging member is pivotally mounted in a lower portion of the chute (24) and is movable between an extended position projecting into the passage (25) of the chute (24) and a retracted position clearing the passage (25). The member (34) inhibits at least larger pieces of food, such as fruit and vegetables, from engaging the disc (23) until the plunger (33) engages the food to move the food towards the disc (32).

16 Claims, 4 Drawing Sheets

JUICE EXTRACTOR

TECHNICAL FIELD

The present invention relates to food processing apparatus and more particularly but not exclusively to juice extractors.

BACKGROUND OF THE INVENTION

Juice extractors include a processing chamber within which there is located a grating disc against which there are applied vegetables and fruit to extract the juice therefrom. A chute extends to adjacent the disc and a plunger is applied to the fruit and vegetables to urge the fruit and vegetables into contact with the disc. The chute is elongated and has a longitudinal axis. The longitudinal axis of the chute is also substantially the rotational axis of the disc.

It has been found that when the disc is rotating and the fruit and/or vegetables are delivered to the chute, the fruit and/or vegetables, and portions removed therefrom, can be thrown from it within the chute until the plunger is applied to the chute. A further problem is that frequently the fruit or vegetables will spin quite violently upon engaging the disc.

The above problem is addressed by the juice extractor of U.S. Pat. No. 5,479,851. This juice extractor has a knife blade positioned transversely of the chute to engage the fruit and vegetables so as to inhibit movement thereof as the fruit and vegetables engage the disc.

SUMMARY OF THE INVENTION

It is an object of the present invention to overcome or substantially ameliorate the above disadvantage and/or to provide an alternative juice extractor to the juice extractor of the above-mentioned US patent.

There is disclosed herein a food processing machine including:
  a base;
  a motor supported on the base;
  a housing attached to the base and providing a processing chamber and a chute having a delivery passage via which food to be processed is delivered to the interior of the chamber;
  a grating disc located in the chamber and connected to the motor so that upon operation of the motor the disc is rotatably driven about an axis, the disc being positioned relative to the chute so that food delivered to the delivery passage is moved therealong to engage the disc; and
  a food engaging member to engage the food, the member being movable relative to the delivery passage between an extended position projecting into the passage to engage food passing therethrough, and a retracted position displaced from the extended position so as to at least not project into the passage to the extent the member does when in the extended position.

Preferably, the member when in the retracted position is substantially clear of the passage.

Preferably, the member is pivotally mounted so as to be angularly movable between the extended and retracted positions thereof.

Preferably, the machine includes a resilient means to urge the member to the extended position.

Preferably, the member is located adjacent the disc.

Preferably, the passage has a substantially central longitudinal axis displaced laterally relative to the axis of the disc.

Preferably, the axis of the disc is generally parallel to the axis of the passage.

Preferably, the axis of the disc is generally vertical and the disc rotates in a generally horizontal plane.

Preferably, the machine further includes a plunger received within the passage to engage the food to move the food therealong towards the disc, and wherein the plunger has a recess within which the member projects when in the extended position.

Preferably, the passage has a delivery opening displaced substantially laterally to a side of the disc axis.

Preferably, the opening has an area the majority of which is displaced laterally of the axis.

Preferably, the passage has a longitudinal axis which is generally parallel to but laterally displaced from the axis of the disc.

Preferably, the member is pivotably mounted so as to be angularly movable between the extended and retracted portions thereof.

Preferably, the passage is generally vertically oriented and the disc axis is also generally vertically oriented. Preferably, the member pivots about a generally horizontal axis for movement between the extended and retracted positions thereof.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
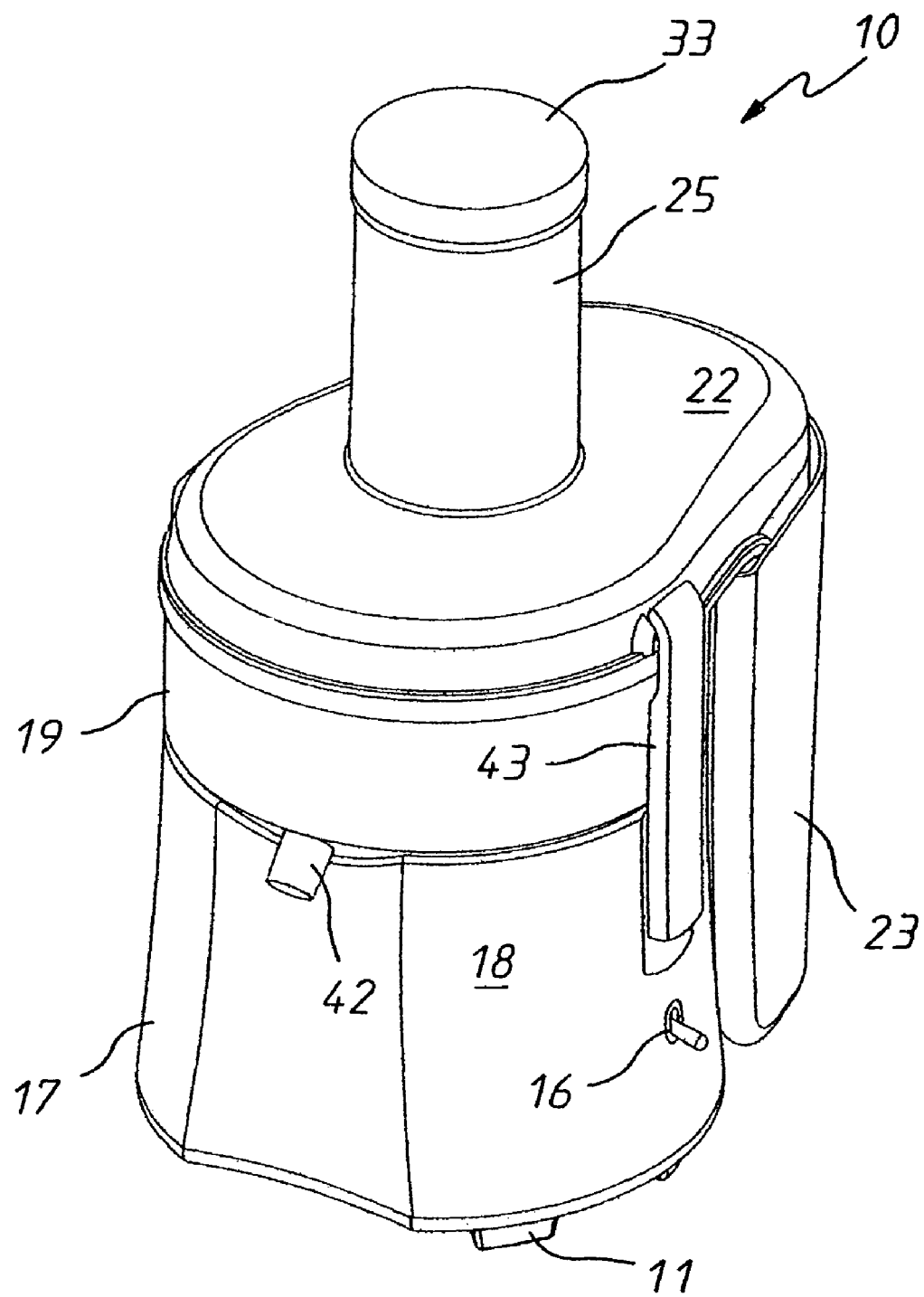
FIG. 1 is a schematic isometric view of a juice extractor.
Figure 2:
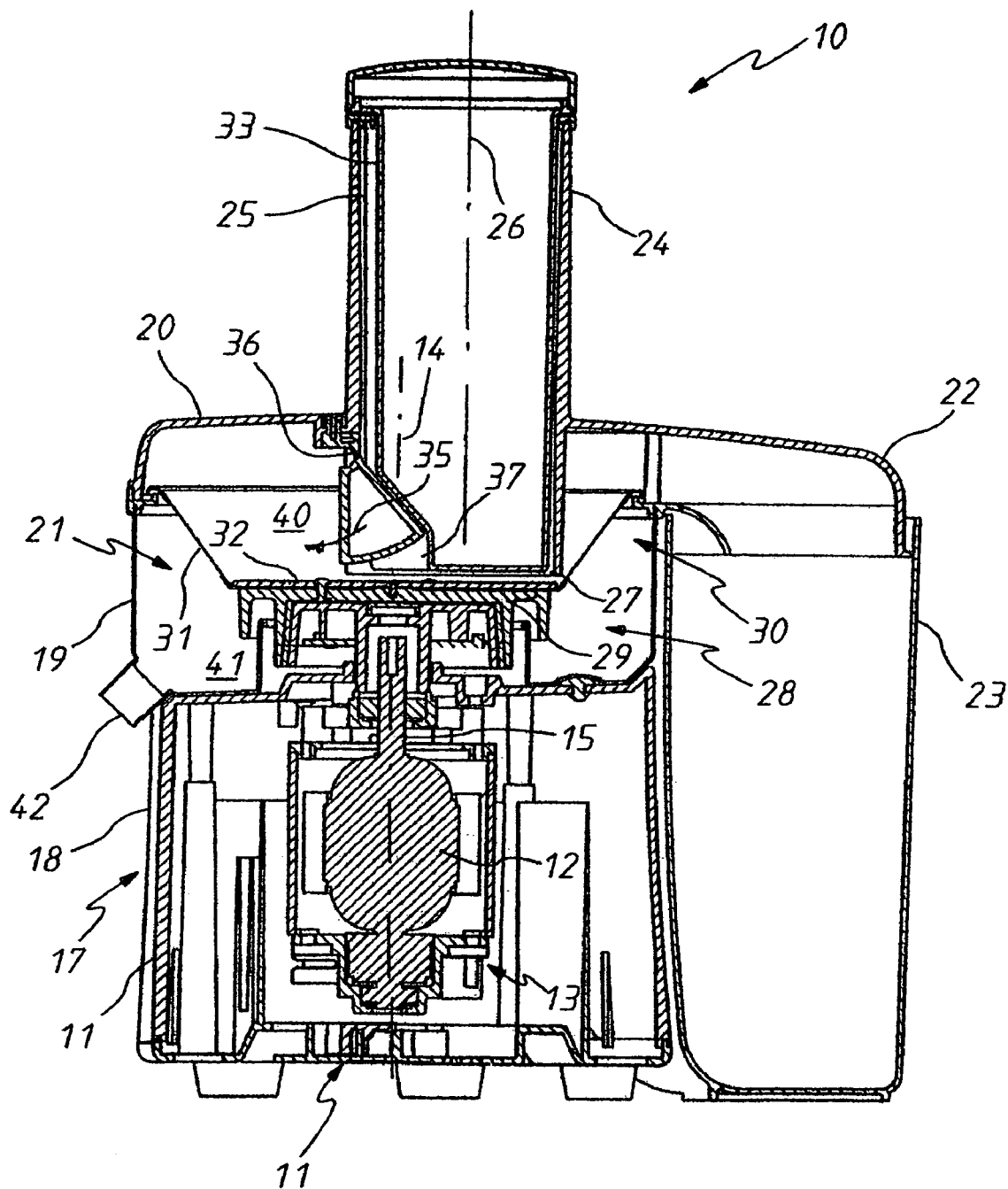
FIG. 2 is a schematic sectioned elevation of the juice extractor of FIG. 1.
Figure 3:
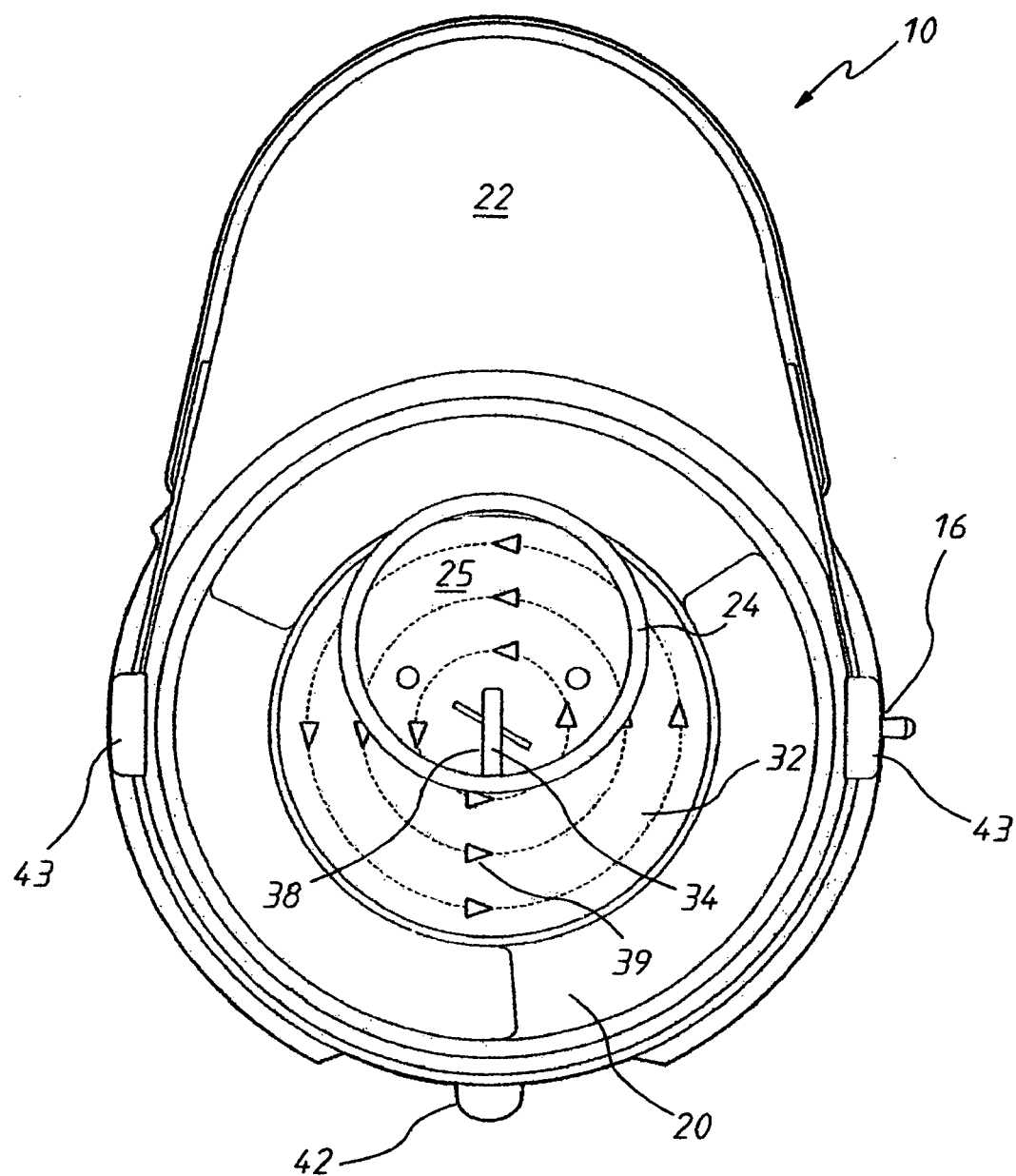
FIG. 3 is a schematic top plan view of the juice extractor of FIG. 1.
Figure 4:
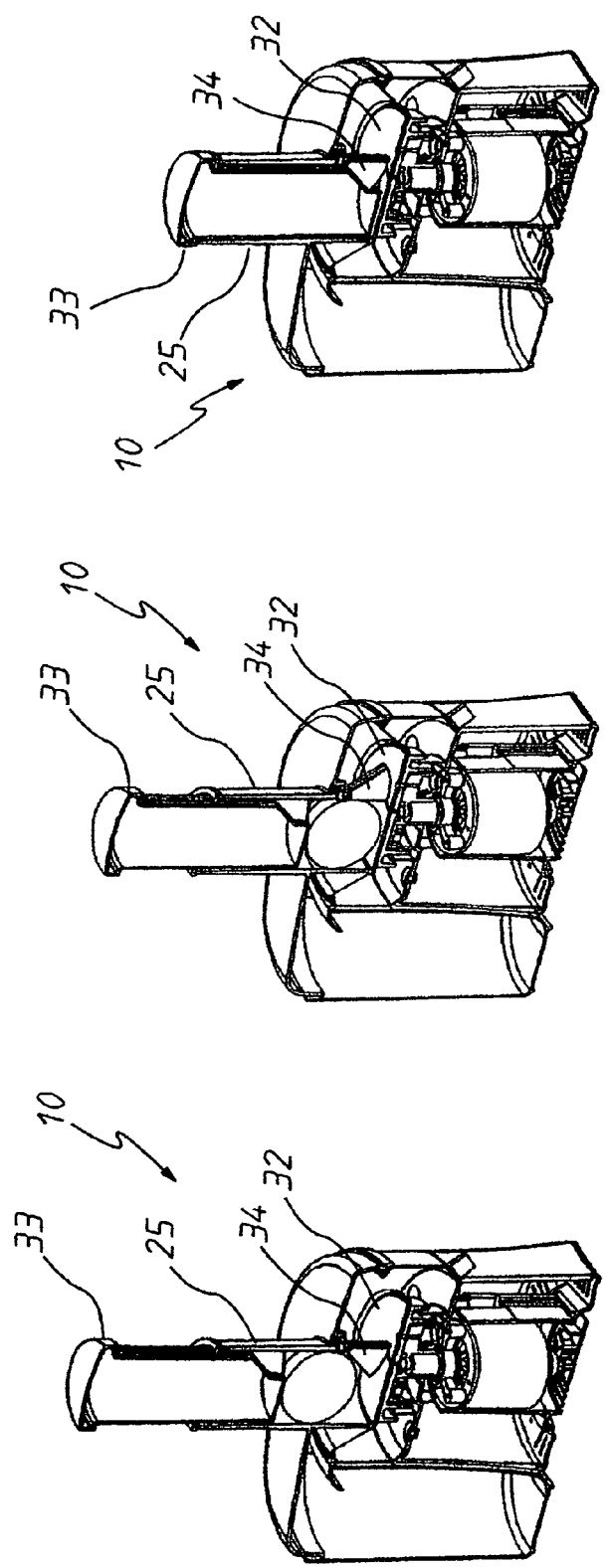
FIG. 4 is a series of schematic sectioned isometric views of the operation of the juice extractor of FIGS. 1 to 3.

In the accompanying drawings there is schematically depicted a juice extractor 10. The extractor 10 includes a base 11 upon which there is mounted an electric motor 13. The motor 13 includes a rotor 12 with a shaft 15 that is rotatably driven about an axis 14 upon operation of the motor 13. More particularly, upon operation of the switch 16, electric power is delivered to the motor 13 to cause actuation thereof.

The juice extractor 10 further includes a housing 17 having a lower portion 18 that generally encloses the motor 13 and associated electrical wiring that would be connected to a main power supply via the switch 16. The housing 11 includes a bowl 19 and lid 20. The bowl 19 and lid 20 cooperate to generally enclose a processing chamber 21. The lid 20 has extending from it a pulp delivery chute 22 that delivers food pulp produced, in operation of the extractor 10, to a receptacle 23. The housing 17 further includes a delivery chute 24 providing a delivery passage 25 via which food is delivered to the chamber 21 for processing. In this embodiment the chute 24 is generally vertically extending and has a generally vertical central longitudinal axis 26. The axis 26 is generally parallel to the axis 14 but spaced laterally thereof. The passage 25 has a lower opening 27.

Attached to so as to be driven by the shaft 15 is a rotatably driven shredding assembly 28 including a mounting 29 attached to the shaft 15. Attached to the mounting 29 is a screen 30 that is frusto-conical in configuration so that the perforated screen wall 31 is circular in transverse cross-section and diverges upwardly. Also attached to the mounting 29 is a grating disc 32 which is adjacent the opening 27. The disc 32 rotates about the axis 14.

To be received within the passage 25 is a plunger 33 that is used to move the food along the passage 25.

Mounted on the lid 20 is a food engaging member 34. The food engaging member 34 is movable relative to the chute 24, and therefore passage 25, between an extended position at which the member 34 projects into the passage 25, and a retracted position displaced in the direction of the arrow 35 from the extended position so as to at least not project into the passage 25 to the extent that the member 34 does when it is in the extended position. More preferably the member 34 when in a fully retracted position is clear of the passage 35. Preferably, the member 34 is pivotally mounted on the lid 20 by means of a resilient hinge 36, the member 34 therefore pivoting about a generally horizontal axis between the extended and retracted positions of the member 34. Accordingly, the member 34 moves in a plane generally parallel to and passing through the axis 26. When engaged, the member 34 pivots downward to the retracted position. Preferably, the plunger 33 has a recess 37 to receive the member 34 when it is in the extended position. Preferably, the plunger 33 has a transverse cross-section that cooperates with the transverse cross-section of the chute 25 so that the plunger 33 when received within the passage 25 is oriented such that the recess 37 is positioned to receive the member 34.

In the above-described preferred embodiment, the axis 24 is displaced laterally relative to the axis 14 so that the majority of the area of the opening 27 is displaced to one side of the axis 14. In this regard it should be appreciated that the opening 27 is adjacent the disc 32.

In use of the above-described juice extractor 10, the member 34 inhibits at least the larger pieces of food, such as fruit and vegetables, from engaging the disc 32 until the plunger 33 engages the food and moves the food toward the disc 32. As the food moves towards the disc 32, the member 34 pivots in the direction of the arrow 35. Accordingly, at least large food items do not engage the disc 32 until the plunger 33 is in the passage 25. This has the advantage of inhibiting food being thrown back up the chute 24.

A further advantage of the above-described preferred embodiment is provided by the displacement of the opening 27 laterally relative to the axis 14. As the opening 27 is located adjacent the disc 32, the smaller food items that engage the disc 32 are inhibited from continually rotating therewith as they will engage the side surface 38 of the member 34. In that respect it should be appreciated the disc 32 is rotating in the direction of the arrows 39.

Preferably, the hinge 36 is resilient so as to urge the member 34 to the extended position, that is, projecting into the passage 25.

The chamber 21 is divided into an upper chamber portion 40 and a lower chamber portion 41 by the screen wall 31. Juice extracted from the fruit passes through the screen wall 31 to be delivered to the lower chamber 41 via which it is drained by means of a spout 42. Pulp collected on the screen wall 31 in the upper chamber portion 40 is urged to move upwardly due to rotation of the wall 31 to be delivered to the chute 22 and therefore the receptacle 23.

Preferably, the lid 22 and bowl 19 are retained attached to the lower portion 18 of the housing 17 by one or more clips 42.

In an alternative embodiment the member 34, rather than pivot, elastically deforms to move to a retracted position.

The invention claimed is:

1. A food processing machine including:
    a base;
    a motor supported on the base;
    a housing attached to the base and providing a processing chamber and a chute having a delivery passage via which food to be processed is delivered to an interior of the chamber;
    a grating disc located in the chamber and connected to the motor so that upon operation of the motor the disc is rotatably driven about an axis, the disc being positioned relative to the chute so that food delivered to the delivery passage is moved therealong to engage the disc;
    a plunger reciprocable in the passage and movable to engage the food and move the food toward the disc; and
    a food engaging member to engage the food, the member being attached to the housing to be movable relative to the delivery passage between an extended position projecting into the passage to engage food passing therethrough, and a retracted position displaced from the extended position so as to at least not project into the passage to the extent the member does when in the extended position.

2. The machine of claim 1, wherein said member when in the retracted position is substantially clear of said passage.

3. The machine of claim 1, wherein said member is pivotally mounted so as to be angularly movable between the extended and retracted positions thereof.

4. The machine of claim 1 further including a resilient means to urge said member to the extended position.

5. The machine of claim 4, wherein said member is located adjacent said disc.

6. The machine of claim 5, wherein said passage has a substantially central longitudinal axis displaced laterally relative to the axis of said disc.

7. The machine of claim 6, wherein the axis of said disc is generally parallel to the axis of said passage.

8. The machine of claim 7, wherein the axis of said disc is generally vertical and said disc rotates in a generally horizontal plane.

9. The machine of claim 8, wherein said plunger has a recess within which said member projects when in the extended position.

10. The machine of claim 9, wherein said passage has a delivery opening displaced substantially laterally to a side of the disc axis.

11. The machine of claim 10, wherein said opening has an area, the majority of which is displaced laterally of said axis.

12. The machine of claim 11, wherein said passage has a longitudinal axis which is generally parallel to but laterally displaced from the axis of said disc.

13. The machine of claim 12, wherein said member is pivotably mounted so as to be angularly movable between the extended and retracted portions thereof.

14. The machine of claim 13, wherein said passage is generally vertically oriented and said disc axis is also generally vertically oriented, and wherein said member pivots about a generally horizontal axis for movement between the extended and retracted positions thereof.

15. A food processing machine including:
    a base;
    a motor supported on the base;
    a housing attached to the base and providing a processing chamber and a chute having a delivery passage adapted to receive a plunger for moving food to be processed to an interior of the chamber;

a grating disc located in the chamber and connected to the motor so that upon operation of the motor the disc is rotatably driven about an axis, the disc being positioned relative to the chute so that food moved along the chute is engaged by the disc; and a food engaging member for intercepting food in the delivery passage, the member being movable relative to the delivery passage between an extended position in which the member projects into the passage to intercept food moving therethrough, and a retracted position displaced from the extended position in which the member is positioned relative to the passage to permit the food to move past the member.

16. The machine of claim 15 wherein the chute has a longitudinal axis and the member is movable in a direction transverse to the longitudinal axis of the chute.

* * * * *